Jan. 5, 1954   R. BASSINGER   2,665,115
PERCUSSION TOOL FOR WELLS
Filed Feb. 13, 1950   4 Sheets-Sheet 1
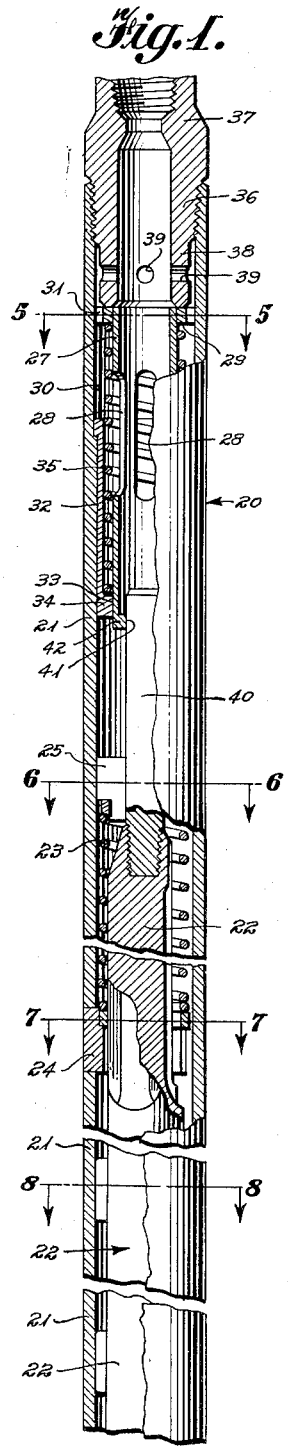
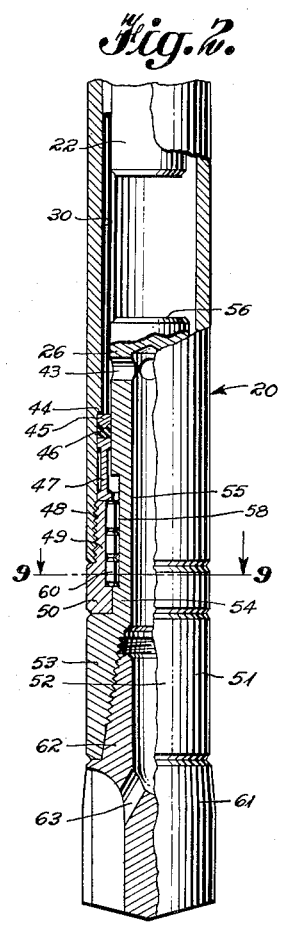
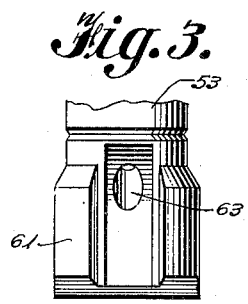
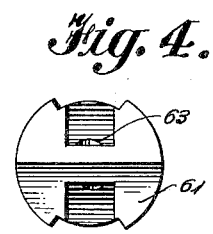
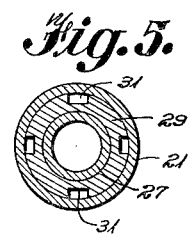
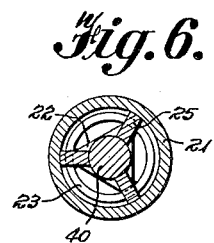
INVENTOR
*Ross Bassinger*
BY *Stevens, Davis, Miller and Mosher*
ATTORNEYS Jan. 5, 1954 R. BASSINGER 2,665,115
PERCUSSION TOOL FOR WELLS
Filed Feb. 13, 1950 4 Sheets-Sheet 2
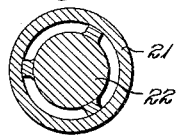
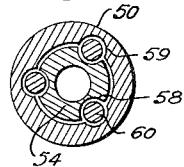
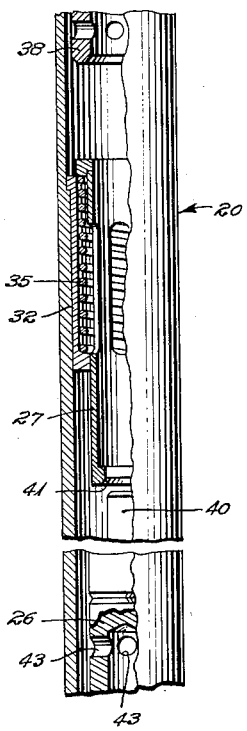
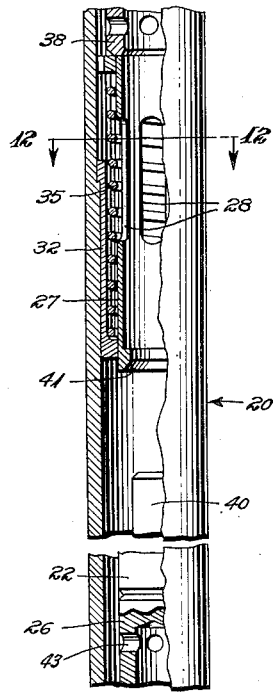
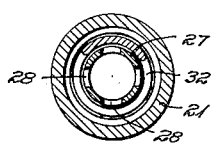
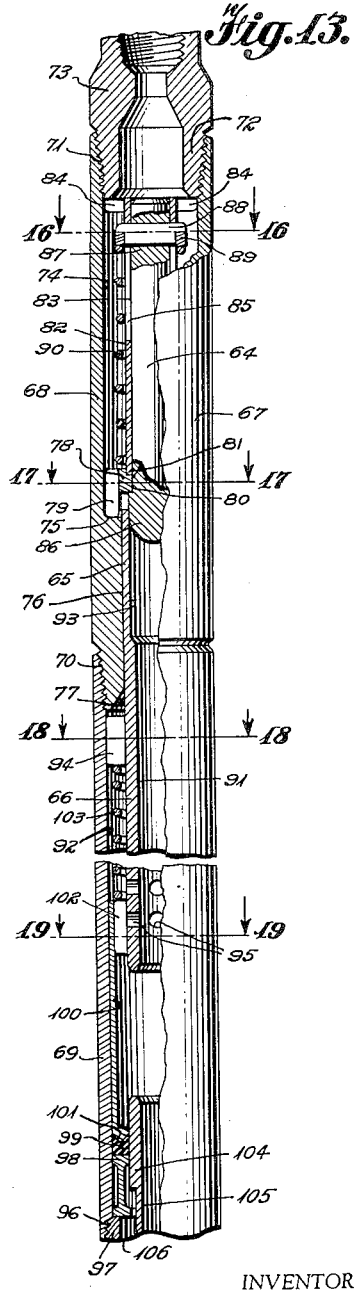
INVENTOR
*Ross Bassinger*
BY *Stevens, Davis, Miller & Mosher*
ATTORNEYS

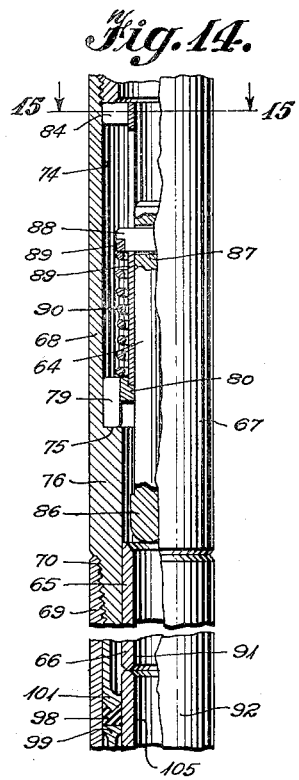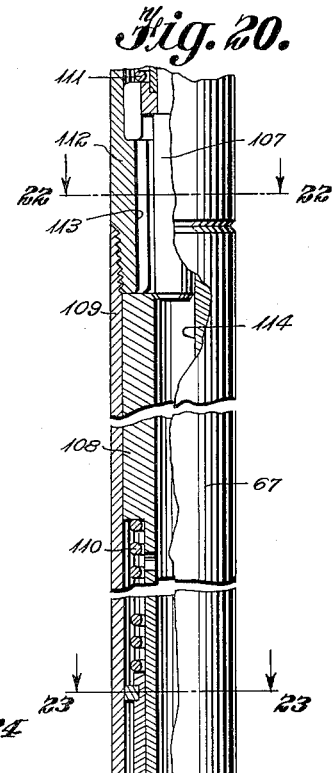

Jan. 5, 1954 R. BASSINGER 2,665,115
PERCUSSION TOOL FOR WELLS
Filed Feb. 13, 1950 4 Sheets-Sheet 4

INVENTOR
*Ross Bassinger*
BY *Stevens, Davis, Miller and Mosher*
ATTORNEYS

Patented Jan. 5, 1954

2,665,115

UNITED STATES PATENT OFFICE 2,665,115

PERCUSSION TOOL FOR WELLS

Ross Bassinger, New Braunfels, Tex.

Application February 13, 1950, Serial No. 143,898

4 Claims. (Cl. 255—4.4)

This invention relates to new and useful improvements in percussion tools for wells and methods of operating the same.

This application is a continuation-in-part of the copending application, Serial No. 686,497 filed July 26, 1946, now Patent Number 2,507,585, issued May 16, 1950, and Serial No. 27,956 filed May 19, 1948, now abandoned.

It has been a widespread occurrence in the drilling industry that in drilling wells in certain localities or fields very hard and rocky formations are sometimes encountered which are very difficult to drill, resulting in uncommonly high drilling expenses and, at the same time, very slow progress in drilling operations. The usual type bits have not proved effective on these formations. Sometimes as little as one foot of hole is drilled before it is necessary to pull the tubing and replace the bit. Obviously, such conditions greatly delay the completion of a well, with corresponding increase in expenses, as well as creating highly undesirable collateral conditions which are not favorable to the driller.

Heretofore, various percussion type bits have been developed and tried in drilling operations in an effort to overcome the foregoing difficulties. None of these bits has heretofore proved successful or answered the need for a drilling assembly sufficiently versatile to be capable of efficient operation under the conditions usually encountered. In some cases attempts have been made to use a cable tool type bit, but necessarily such operations were not satisfactory after a certain depth of hole had been obtained. Then, too, drills using reciprocating parts having their interfaces lubricated with flushing fluids containing sand or other gritty materials are subjected to considerable abrasion and the resulting wear has been a problem of some importance.

It is therefore an object of this invention to provide an improved percussion tool for oil wells, said tool being characterized by versatility, ease of operation and high resistance to wear.

A particular object of this invention is to provide a percussion tool for wells which is actuated by drilling fluid but through which drilling fluid may be delivered without the delivery of percussion blows at the option of the operator.

It is contemplated according to this invention to provide an improved percussion tool of the character described which employs differential spring loading on pressure fluid responsive elements of the tool to permit the selective control of said elements and the operation or non-operation of the tool as desired.

It is a still further object of this invention to provide a means of greatly reducing the wear of the moving parts of the bit hammering equipment.

The invention will be more readily understood from a reading of the following specification and by reference to the accompanying drawings wherein examples of the invention are shown, and wherein:

Figure 1 is a longitudinal view, partly in elevation and partly in section, of a percussion tool constructed in accordance with this invention;

Figure 2 is a continuation of Figure 1 showing the lower end of the tool;

Figure 3 is a view in elevation of the drill bit taken at right angles to Figure 2;

Figure 4 is a bottom view of the drill bit;

Figure 5 is a horizontal cross-sectional view taken on the line 5—5 of Figure 1;

Figure 6 is a horizontal cross-sectional view taken on the line 6—6 of Figure 1;

Figure 7 is a horizontal cross-sectional view taken on the line 7—7 of Figure 1;

Figure 8 is a horizontal cross-sectional view taken on the line 8—8 of Figure 1;

Figure 9 is a horizontal cross-sectional view taken on the line 9—9 of Figure 2;

Figure 10 is a view similar to Figure 1 showing the upper portion thereof with the elements in a different position;

Figure 11 is a view similar to Figure 1 illustrating still another position of the elements of the tool;

Figure 12 is a horizontal cross-sectional view taken along the line 12—12 of Figure 11;

Figure 13 is a longitudinal view, partly in elevation and partly in section, showing a modified form of the tool;

Figure 14 is a view similar to Figure 13, showing the elements of the tool in a lowered position;

Figure 15 is a horizontal cross-sectional view taken along the line 15—15 of Figure 14;

Figures 16, 17, 18 and 19 are horizontal cross-sectional views taken along the respective lines of Figure 13;

Figure 20 is a view similar to Figure 1 showing the invention applied to a percussion jar;

Figure 21 is a view similar to Figure 1 showing the upper portion of a modified form of percussion jar;

Figures 22 and 23 are horizontal cross-sectional views taken upon the respective lines of Figure 20;

Figure 24 is a horizontal cross-sectional view taken upon the line 24—24 of Figure 21;

Figure 27:
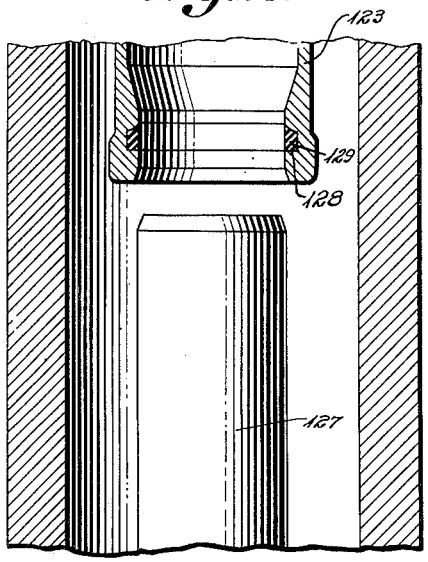
Figures 27 and 28 are vertical sectional views of a portion of the tool similar to Figure 26 showing modifications of the piston and control sleeve.

Referring first to Figures 1 to 12, inclusive, of the drawings, the numeral 20 designates a well percussion tool of the type adapted to reciprocate under pressure fluid or to deliver a rapid series of impact blows to a bit or other suitable tool mounted upon its lower end. The tool 20 has a hollow interior defining a housing 21, within which an elongated hammer 22 is mounted for axial reciprocation. A coil spring 23 is located within the housing and confined between a projection 24 carried by the housing 21 and a projection 25 carried at and by the upper end of the hammer so as constantly to urge said hammer upwardly within the housing. Upon downward movement the lower end of the hammer strikes an anvil 26 (Figure 2) which is connected to the bit or other suitable device in a manner to be hereinafter described. For causing reciprocation of the hammer, a control sleeve 27 is positioned in the upper portion of the housing 21. The sleeve 27 is provided with elongated ports 28 in its central portion and carries an annular outwardly extending flange 29 (Figure 5) upon its upper end, said flange having a snug sliding fit within the inner bore 30 of said housing 21. A plurality of notches 31 are provided at intervals around the periphery of flange 29 to permit fluid under pressure to pass thereby. An elongated collar 32 is suitably affixed to the wall of the bore 30 and encircles the lower end of the sleeve 27, being spaced therefrom. The sleeve 27 has a snug sliding fit within the bore 33 of an internal annular flange 34 carried upon the lower end of the collar 32 and projecting inwardly therefrom. A suitable coil spring 35 is confined between the upper face of flange 34 and the under side of the flange 29 so as to urge the control sleeve 27 upwardly within the bore 30 at all times. The upper end of the housing 21 is screw-threaded and receives the screw-threaded pin 36 of a connecting collar 37. An annular skirt depends from the pin or plug 36 within the bore 30 and carries radial ports 39 to permit the circulation of fluid under pressure between said skirt and the walls of the bore 30. This fluid has access to the space between the bore 30 and the sleeve 27 by flowing through the notches 31 of the flange 29, see Figure 5. The lower edge of the skirt 38 of the plug 36 acts as a stop to limit the upward travel of the control sleeve 27 under the action of the spring 35 while the engagement of the flange 29 on the sleeve 27 with the upper end of the collar 32 limits the downward travel of said control sleeve.

The hammer 22 carries an axially upstanding piston or plunger 40 having a snug sliding fit within the bore 41 of an internal annular flange 42 provided upon the lower end of the control sleeve 27. When both the control sleeve and the hammer are in their uppermost position as illustrated in Figure 1, the piston 40 engages within the bore 41 so as to shut off the downward flow of fluid under pressure through the sleeve 27.

This type of tool is normally operated by means of drilling fluid or mud which is employed in drilling wells and particularly for drilling oil wells. The drilling fluid passing downwardly under pressure through the tubing string enters into the coupling 37 and passes downwardly through the ports 39, notches 31 and ports 28 into the control sleeve 27. The pressure of this fluid forces the control sleeve downwardly, compressing the spring 35, and when said sleeve reaches the lower limit of its travel, causes the piston 40 and thereby the hammer 22 to move sharply downwardly against the anvil 26, thereby compressing the hammer return spring 23. As illustrated in Figure 10, when the hammer reaches the lower limit of its travel, the piston 40 is withdrawn from the bore 41 regardless of the fact that the control sleeve 27 is in its lowermost position. When this withdrawal occurs, the forces exerted upon the control sleeve by the pressure fluid are withdrawn to the extent as to allow the spring 35 to return said sleeve to its uppermost position, as illustrated in Figure 11.

As soon as the hammer has struck the anvil 26 and dissipated its energy of momentum thereto, the spring 23 as shown in Figure 1 is free to return the hammer to its upper position and does so since the pressure of the drilling fluid is no longer confined to the upper end of the piston 40 but may flow downwardly around the hammer and through the ports 43 of the anvil 26. (See Figures 1, 10 and 11.) Upon the hammer reaching its upper position wherein it again engages the bore 41, the cycle is repeated, and in this manner the percussion tool continues to operate delivering impact blows of considerable magnitude to the anvil 26. As many as 400 blows per minute have been obtained with tools of this type, said blows being of such force as to provide very efficient and rapid drilling of the desired well. More particularly, this modification of piston and sleeve is achieved by maintaining the size of the piston the same and enlarging the outside diameter of the control sleeve while increasing the inside diameter of the control sleeve at its lower end.

Figure 25:
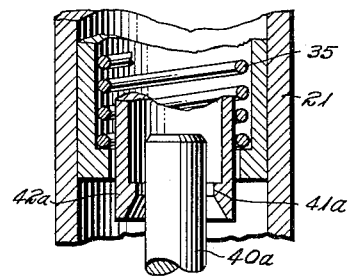
Figure 25 is a vertical section of a portion of the tool showing a modification of the piston and control sleeve.

It is not necessary that the piston have a close fit within the control sleeve. In Figure 25 is shown a modification of these elements in which the piston 40a is considerably less in diameter than the bore 41a of a control sleeve 42a, the control sleeve 42a being increased in diameter to maintain the effective area of the piston. With such a modification, a portion of the drilling fluid would flow at all times through the annular space between the piston control sleeve and a portion of the drilling fluid pressure thus would be dissipated. Nevertheless, sufficient pressure and volume of drilling fluid would remain to operate the tool effectively.

It will be noted that the tool, as described thus far, continues to operate so long as the drilling fluid is pumped downwardly therethrough. It is often desired to circulate drilling fluid through the tubing string of the well without having the percussion tool operate, and it is to this particular problem that attention is now directed. It has been found that with proper selection of the springs 23 and 35, along with the control of the areas of the piston 40 and the sleeve 27 exposed to the drilling fluid, a quite positive control of the operation of the percussion tool may be obtained. Assuming that the drilling fluid under pressure is conducted to the tool while it is in the position shown in Figure 1, it will be noted that the pressure of such fluid acts upon an area of the piston 40, and therefore upon the hammer 22, equal to the cross-sectional area of said piston. This pressure is also acting upon an area of the control sleeve 27 equal to that cross-sectional area occupied by the wall of said piston plus the area of the upper face of the flange 42. Opposed to the force acting upon the piston 40 is the force exerted by the spring 23 while the force exerted by the spring 35 is in opposition to the pressure exerted upon the control sleeve. The forces exerted by these two springs may be divided by the exposed area of the piston and the sleeve to arrive at a value representing the spring-loading per square inch for each of these elements. Thus, assuming the piston 40 is of such diameter as to give it a cross-sectional area of three square inches and that the spring 23 exerts a net upward force of 300 pounds, the spring-loading at the upper end of the piston 40 will amount to 100 pounds per square inch of area exposed to the drilling fluid. Similarly, the thickness or width of the flange 22 and of the wall of the sleeve 27 may be in the neighborhood of ¼ of 1 inch so that the sleeve exposes an area of 1 and ½ square inches. The spring 35 may be selected to exert a net upward force of 200 pounds upon the sleeve, which force divided by the exposed area of 1 and ½ square inches gives a spring-loading for the sleeve of 133 pounds per square inch of exposed surface.

Now, assume a body of drilling fluid disposed in the tubing above the percussion tool and to which a pressure load of 500 pounds per square inch is suddenly applied. The mass of the control sleeve is obviously greatly less than the mass of the hammer 22 so that the inertia of said hammer far exceeds the inertia of the control sleeve. Under these conditions, the sudden thrust of pressure far exceeding the spring-loading of either element will force the control sleeve downwardly to its lower limit before any appreciable movement of the hammer takes place. Following this procedure, the percussion tool will go into its normal impact operation and will continue such operation so long as fluid under pressure continues to be delivered thereto.

However, when it is so desired, the flow of the drilling fluid may be established without causing the percussion tool to operate. Instead of suddenly placing pressure upon the drilling fluid, the pressure thereon may be slowly and gradually increased so as to apply a gradually increasing pressure to the piston 40 and the control sleeve 27. Under these conditions, the inertia of the hammer is of no effect since there is no sudden thrust of pressure fluid and no conditions under which the inertia becomes controlling. Following this procedure, as soon as the pressure exerted is slightly in excess of 100 pounds per square inch, the piston 40 and therefore the hammer 22 will commence to move downwardly within the bore 41. However, because of the higher spring-loading per square inch of the control sleeve, the latter will not move any appreciable distance. The gradual increase of pressure is continued until the piston 40 is entirely withdrawn from the bore 41, at which time, full pressure may be applied so as to cause the maximum flow of drilling fluid through the percussion tool.

When these conditions obtain, the control sleeve remains in its upper position since no drilling fluid is trapped and exerting pressure to force it downwardly. The piston 40 will be disengaged from the bore 41 and the drilling fluid will flow downwardly through said bore. The jetting action of the downwardly coursing drilling fluid is sufficient to maintain the spring 23 compressed to some extent by acting upon the upper end of the piston 40 and keep the hammer in a downwardly displaced position. However, in contrast to the normal operation of the percussion tool, there has been no sudden downward movement of the hammer and delivery of its energy of momentum to the anvil 26. Thus, the spring 23 is unable to take control and return the hammer and piston to their uppermost position against the downwardly directed stream of drilling fluid, and the flow of such fluid may be continued indefinitely through the percussion tool and downwardly through the anvil 26 without reciprocation of the hammer taking place. As soon as it is desired to reassume the percussion and impact function of the tool, the drilling fluid may be momentarily shut off and then suddenly reapplied to cause the inertia of the hammer to come into play and institute normal percussion operation of the tool.

Of course, it is to be kept in mind that the spring values and the areas recited are illustrative only and may be varied widely. It is only necessary for this type of operation that the effective or net spring-loading per square inch of exposed area for the control sleeve exceed the like value for the hammer. It is also to be noted that the dead weight of the hammer, which may be several hundred pounds, is to be subtracted from the gross value of the spring 23 in determining the net spring-loading per square inch of the exposed area for the piston 40. The weight of the control sleeve must similarly be subtracted from the gross value for the spring 35, but the weight of this sleeve is so small in comparison with the weight of the hammer 22 as to be almost negligible. Keeping this in mind, it is apparent that the actual or gross force exerted by the spring 23 may be several times the force exerted by the spring 35.

Another modification of the spring-loading idea which is contemplated finds the areas exposed to the flushing fluid the same as above mentioned, but which finds the spring-loadings reversed. In other words, the spring 23 is chosen so that it exerts a net upward force of 400 pounds and the cross-sectional area of the piston 40 being three square inches, the spring-loading at the upper end of the piston 40 will amount to 133 pounds per square inch of area exposed to the drilling fluid. Similarly, the spring 45 is selected to exert a net upward force of 150 pounds upon the sleeve, which force divided by the exposed area of 1 and ½ square inches gives a spring-loading for the sleeve of 100 pounds per square inch of exposed surface. The spring-loading, then, under these conditions, is exactly the reverse from that previously described. Under these conditions, when a body of drilling fluid is disposed in the tubing above the precussion tool, after which a pressure load of 500 pounds per square inch is suddenly applied, a sudden thrust far exceeding the spring-loading of either element will force the control sleeve downwardly to its lower limit before any appreciable movement of the hammer takes place. This, of course, is due to the great difference in inertia between the sleeve and the hammer. This part of the operation is similar to that previously described in connection with the opposite spring-loading.

When, however, the pressure upon the drilling fluid is slowly and gradually increased, so as to apply a gradually increasing pressure to the piston 40 and the control sleeve 27, the difference in inertia of the sleeve and the piston does not come into play. The inertia of the hammer is of no effect since there is no sudden thrust of pressure fluid and no conditions under which the inertia becomes controlling. Following this procedure, as soon as the pressure exerted is slightly in excess of 100 pounds per square inch, the sleeve 27 will commence to move downwardly and the reciprocating action commences in a manner similar to the application of a sudden pressure load. It is seen from this that with the spring-loadings reversed, reciprocating action takes place regardless of whether the pressure applied to the fluid is gradual or sudden. This type of action may be obtained by varying the spring-loading by a change in area as well as a change in spring thrust.

As shown in Figure 2, the internal bore of the housing 20 is enlarged slightly near the lower end of the housing to form a downwardly facing shoulder 44 which receives an annular beveled ring 45. A pressure responsive packing ring 46, equal in diameter to the ring 45, is disposed beneath said ring and held in snug engagement therewith by a spacer collar 47 positioned beneath the packing ring. The extreme lower end of the conductor carries internal screw threads 48 which receive the screw-threaded pin 49 of a retaining collar 50. The upper end of the pin 49 abuts the lower edge of the collar 47 so as to hold the packing ring 46 in position.

A bit carrier 51, constituting a part of the anvil 26, is disposed at the lower end of the conductor 20. The bit carrier 51 is provided with a head 52 of an external diameter about equal to that of the conductor 20 and has tapered, screw-threaded internal socket 53 in its lower end. A tubular shank 54 extends upwardly from the head 52 and is provided with an axial bore 55 which communicates with the socket 53. The upper end of the bore is closed to form an anvil surface 56 upon the extreme upper end of the shank. Radial ports 43 are provided in the side walls of the shank near the upper end thereof to permit the circulation of drilling fluid. As shown in Figure 9, a plurality of semi-circular grooves 58 extend longitudinally of the shank 54 near its lower end and upon the exterior surface thereof. Complementary grooves 59 are formed internally of the retaining collar 50 and a plurality of splines 60 in the shape of short cylindrical rollers engage within the complementary grooves 58 and 59 to prevent rotative movement of the bit carrier 51 with respect to the retaining collar 50.

As shown in Figure 2 of the drawings, the grooves 58 formed upon the shank 54 are somewhat longer than the respective splines 60 carried therein so that the carrier may undergo limited longitudinal movement with respect to the collar 50 and the conductor 20 while being held against rotation with respect thereto. This structure makes provision for protecting the conductor 20 and the tubing string upon which it is supported from the shock of the blow delivered to the anvil 26 by the hammer 22.

As shown in Figures 2, 3, and 4, a bit 61, which may be of any desirable type, has a screw-threaded pin or boss 62 engaged within the box 53, whereby the bit is rigidly secured to the bit carrier 51. The bit is provided with downwardly extending fluid ports 63.

In Figures 13 to 19 of the drawings is illustrated a modified form of the percussion tool in which the control sleeve 27 is replaced by a control piston 64 and the piston 40 of the percussion hammer is replaced by a pressure responsive sleeve 65 carried at the upper end of a relatively heavy tubular hammer 66. Thus the modification, in a broad aspect, represents a reversing of the piston and sleeve arrangement illustrated in Figure 1.

In this form of the invention the tubular conductor 67 of this modification of the invention is divided into an upper section 68 and a lower section 69 connected by a screw-threaded joint 70 at their adjacent ends. The upper conductor 68 carries internal screw thread 71 at its upper end which engages the screw-threaded pin 72 of the collar 73 by which the tool is connected to the usual tubing or drilling string. The upper section 68 is provided with a longitudinal bore 74 which is reduced in diameter at a point spaced above the lower end of the section to form a shoulder 75 and a reduced bore 76. The extreme lower end of the section 68 is beveled at 77 for purposes to be set out hereinafter.

A ring 78 is disposed above the shoulder 75 and carries a plurality of radially directed fins or supporting members 79 formed integrally of the ring and extending downwardly therefrom to engage the shoulder 75 whereby the ring is securely held against downward movement with respect to the upper section 68. The axial bore 80 of the ring has its upper portion counterbored at 81 to receive the lower end of a sleeve 82 having a bore 83 substantially equal in diameter to the bore 80 of said ring. The sleeve 82 is provided at its upper end with a plurality of radially extending fins or lugs 84 which engage beneath the pin 72 of the collar 73 to secure the sleeve and the ring 78 against upward movement. A pair of diametrically opposed longitudinal slots 85 extend throughout the upper portion of the sleeve.

A cylindrical control piston 64 has a sliding fit within the sleeve 82 and is greater in length than the sleeve, the lower end of the piston being enlarged to form a head 86 which extends below the ring 78 and engages therebeneath. A transverse slot 87 is formed near the upper end of the piston 64 and receives a cotter 88 which extends through the slot 85 of the sleeve 82. The lower sides of the projecting ends of the cotter are cut away to receive an annular ring 89 which encircles the sleeve 82 and engages within the cut-away portion to prevent displacement of the cotter from the slot 87. A coil spring 90 is compressed between the ring 78 and the ring 89 so as to urge the cotter 88 and the piston 64 upwardly at all times. A tubular hammer 66, having an axial bore 91, has a sliding fit within the bore 76 and extends therebelow within the bore 92 of the lower conductor section 69. The upper portion 93 of the bore 91 is enlarged slightly in diameter so as to have a snug sliding fit with the head 86 of the piston 64, said enlarged portion extending downwardly a distance substantially equal to the length of the slots 85. The hammer is provided at spaced intervals throughout its length with a plurality of radially extending external fins or lugs 94 which serve to center the hammer within the bore 92 of the lower section of the conductor and to guide the hammer in its travel therethrough. A plurality of spaced radial ports 95 cut in the lower portion of the wall of the hammer allow proper circulation of the drilling fluid and prevent the fluid from cushioning the hammer blows. Internal screw threads 96 are formed at the extreme lower end of the lower conductor section to receive the screw-threaded pin of a retaining collar 97 similar in all respects to the collar 50 shown in the first form of the invention. A spacer collar 98 similar to the collar 47 is disposed upon the upper end of the pin 96 and carries an annular pressure-responsive packing ring 99 upon which rests a packing retaining sleeve 100. The sleeve 100 has a snug fit within the bore 92 and is formed with a beveled, inwardly directed flange 101 at its lower end, said flange serving to retain the packing ring 99 in position. The sleeve extends upwardly to a point spaced slightly above the lower end of the hammer 66 when said hammer is in its lower position, and a plurality of inwardly directed fins or lugs 102 are provided upon the upper end of the sleeve. The hammer has a sliding fit within said lugs and a coil spring 103 is compressed between the lugs 102 and the lugs 94 carried by the hammer so that the spring constantly tends to urge the hammer upwardly. The upward movement of the hammer is limited by engagement of the lugs 94 with the lower end of the upper section 68.

A bit holder (not shown) is positioned in the lower end of this modification of the tool and is provided with an upwardly extending shank 104 having an axial bore 105. The shank 104 is splined to the retaining collar 97 by means of cylindrical roller splines 106. The axial bore 105 extends throughout the length of the shank 104, and the upper periphery of said shank is adapted to act as an anvil to receive impact blows delivered through the lower periphery of the hammer.

With the structural details of this modification in mind, it appears obvious that the operation of this modified tool is extremely similar in every respect to that form previously described with reference to Figure 1 and for this reason will not be explained in detail.

Now, it is noted that the occasion may arise wherein the control element 64 presents a large cross-sectional area to the pressure of the drilling fluid when the pressure responsive means are a portion 65 of the hammer 66. Assuming the same dimensions given for illustrative purposes for the first described form of the invention, the control piston 64 would present a cross-sectional area of three square inches while the upper end of the sleeve 65 of the hammer 66 would present an area of one and ½ square inches. Under these circumstances the spring 99 carrying the control piston 64 might be of a suitable size to provide a net upwardly directed force upon the piston 64 of 500 pounds, thus making the net spring-loading per square inch of exposed area of said piston of 166 pounds per square inch. The spring 103 carrying the hammer 66 would then present a net upwardly directed force of about 200 pounds so as to provide a spring-loading upon the sleeve 65 of 133 pounds per square inch of exposed surface of said sleeve.

Under these circumstances, when the pressure of the drilling fluid is applied slowly and gradually, the hammer will first move downwardly because of its lower spring-loading and the flow will be established through said hammer and through the shank 104 which it strikes without starting said hammer into its reciprocal impact operation. However, when it is designed to effect such reciprocal impact operation, the flow of the drilling fluid is applied suddenly and directly to the percussion tool under which conditions the inertia of the hammer 66 will be sufficient to resist the flow a time long enough to permit pressure to build up to force the control piston 64 downwardly within the sleeve 65. Once this action has taken place the normal percussion impact operation of the tool commences and proceeds indefinitely.

The invention may also be applied to percussion jars which are fluid-driven percussion tools adapted to deliver an upward blow or impact to the tubing string rather than delivering a downward blow to a drill bit or other suitable device. Such a jar is illustrated in Figures 20, 22 and 23 and carries a control piston 107 very similar to the piston 64. The hammer 108 is disposed therebelow within the housing 109 of the tool and rests upon a suitable coil spring 110. Spring 111 carries the piston 107 and urges it upwardly within the housing 109. The upper end of the hammer 108 is weighted and is urged against the relatively heavy collar 112 forming a portion of the housing 109. The collar 112 is provided with a restricted fluted bore 113 within which the piston 107 reciprocates and which is vertically aligned with a bore 114 carried by the hammer and adapted to receive the lower end of said piston 107.

Upon sudden application of drilling fluid under pressure the inertia of the hammer holds it relatively stationary while the control piston 107 is forced downwardly within the bore 114. When the control piston reaches the lower limit of its travel the fluid pressure forces the hammer 108 downwardly, thus compressing the spring 110 and storing energy in said hammer. The downward motion of the hammer continues until the bore 114 is withdrawn from engagement by the piston 107 at which time the spring 111 snaps the control piston 107 to its uppermost position. The bore 114 is then opened so as to relieve the pressure of the drilling fluid and permit the spring 110 to return in the hammer 108 upwardly with considerable speed and impetus, thus causing the upper end of the hammer to deliver a sharp blow of considerable magnitude upon the lower end of the collar 112. This blow is, of course, transmitted through the housing 109 to the tubing string which is normally connected to the screw-threaded pin 115 provided at the lower end of said housing. As was the case with the percussion tool previously described, the present jar is capable of delivering several hundred blows per minute, each blow being of considerable magnitude and force.

As is customary in the case of the employment of jars of this type, it is often desired to have the jar in inactive condition while yet permitting the circulation of drilling fluid through the tubing string. To accomplish this result the springs 110 and 111 are selected for size in accordance with the practice described hereinbefore so as to cause the spring-loading per square inch of exposed area of the hammer to be substantially less than the spring-loading per square inch of exposed area of the control piston 107. With this arrangement, the slow and general admission of drilling fluid under pressure will first cause the hammer to move downwardly without disturbing to a material degree the position of the piston 107 so that the bore 114 is withdrawn from engagement by the piston 107 and the flow of drilling fluid may take place downwardly through the bore 114 without the reciprocal jarring action normally provided by this tool. When it is desired to effect the jarring operation, the flow of the drilling fluid is shut off to permit the hammer to return to its upward position and then suddenly recommence to instigate the jarring operation described.

A modification of this jar is illustrated in Figure 21, this modification employing a control sleeve 116 and a hammer piston 117 similar to the control sleeve 27 and the piston 40 illustrated in Figure 1 and described hereinbefore. In this modification the upper end 118 of the hammer is weighted and adapted to abut a relatively heavy collar 119 forming a portion of the housing 120. The control sleeve 116 is reciprocal within the bore 121 of the collar 119 and is provided with a reduced bore 122 at its lower end for receiving the piston 117. The operation of this modification is substantially identical to that described in connection with the form of invention shown in Figure 20. The hammer and control sleeve springs are arranged in a similar fashion to provide a lower spring-loading for the hammer than for the control piston so as to permit the selective operation or non-operation of the jar as desired.

Hereinbefore only coil springs have been referred to for actuating the various control pistons in the sleeves and the hammer elements of the several modifications. However, it is to be pointed out and noted that tension springs may be used in place of the compression springs and that a plurality of springs may be used in place of a single spring. Also, other types of resilient or spring-like elements may be employed such as various elastic elements of a rubber-like nature or springs of other than a coil construction. The invention is concerned principally with the effecting of a differential loading of the control elements, be it sleeve or piston, and of the hammer and its associated elements which cooperates with the aforesaid control elements. Phrased in general terms, the invention may be described as the providing of a structure within a percussion tool of the character described wherein the force tending to maintain the hammer in its uppermost position, when compared to the area of said hammer or its associated elements which is exposed to the pressure of the drilling fluid, is lesser than the force maintaining the control sleeve or piston in its uppermost position or normal position as compared with or in proportion to the area of said control elements exposed to the pressure of the drilling fluid. Since the hammer is invariably of greater mass and size than the control element, its natural inertia when the pressure of the drilling fluid is suddenly applied will permit the commencing of normal percussion operation. However, because of the differential spring-loading recited, the flow of the drilling fluid may be established through the device or tube by admitting the drilling fluid under pressure in a gradual and slow manner so as preferentially to overcome the force maintaining the hammer in its upper position and withdraw its piston or sleeve from engagement with or by the control sleeve or piston and thus open a flow passage through which the drilling fluid continues to flow indefinitely without the creation of any impact or percussion operation. The operator of the tool is thus provided with a simple and effective means of selecting the type of operation he desires and may commence percussion operations at will or may merely blow the drilling fluid through the percussion tool with the latter remaining in an inoperative or inactive condition as he so elects.

The invention is also concerned with the redistribution of the spring-loading as above-mentioned so that the control element has less spring-loading than the hammer and consequently reciprocating action between the two reciprocating elements will take place regardless of the nature of the pressure applied to the drilling fluid. This particular arrangement has been heretofore described with reference only to that form of the invention disclosed principally in Figure 1. It must be noted, however, that this principle of operation may also be applied to any and all of the modifications disclosed herein.

Additionally, the invention provides means for greatly minimizing the damage to the reciprocating elements due to gritty material carried by the drilling fluid which causes abrasion of the interfaces of the reciprocating elements. This particular expedient is accomplished by means principally disclosed in Figures 26, 27 and 28.

Figure 26:
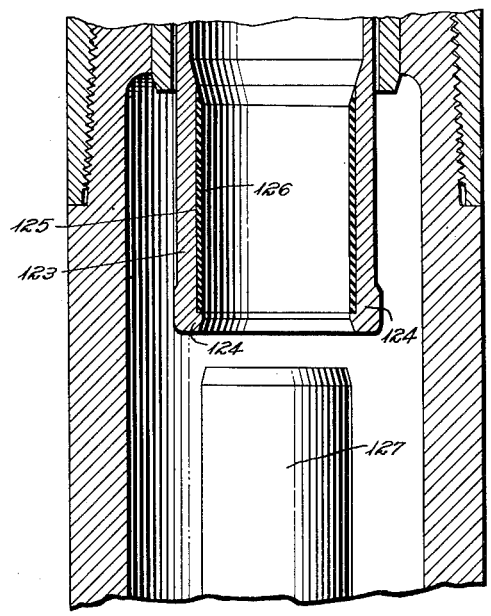
Figure 26 is a vertical sectional view of a portion of the tool showing a modification of the piston and control sleeve.

With particular reference to Figure 26, the control sleeve 123, which is similar to control sleeve 21 shown in Figure 1, is provided at its lower end with an annular shoulder 124 which reduces by some small amount the natural bore 125 of the control sleeve 123. The bore 125 of the control sleeve 123 is coated with rubberized material or the like 126. Sufficient coating is required so that the new bore of the control sleeve 123 is approximately equal to the bore of the control sleeve at the shoulder 124. When the piston 127, which is similar to the piston 40 shown in Figure 1, engages the control sleeve 123, the two reciprocating elements are insulated from each other by the rubberized material 125. This greatly reduces the frictional wear between the two elements.

Another modification of this idea is shown in Figure 27. In that figure the control sleeve 123 is provided at its lower extremity with an annular groove 128 which is appropriately filled with rubberized material or the like 129.

Figure 28:
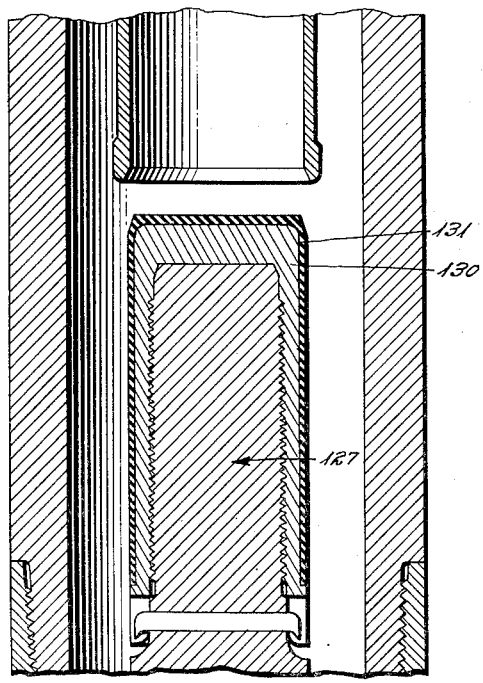

It is, of course, not necessary that the control sleeve be the element which has the rubberized coating. As shown in Figure 28, the piston 127 may be provided with a screw-threaded cap 130 which cap is coated with rubberized material or the like 131.

The arrangement as shown in connection with Figures 26, 27 and 28 may be variously interchanged, the main purpose being to provide interfaces between the reciprocating parts which are coated with rubberized material or the like to prevent frictional wear of the parts, which wear is normally greatly enhanced by the presence of gritty material in the flushing fluid.

The foregoing description of the invention is explanatory thereof and various changes in the size, shape and materials, as well as in the details of the illustrated construction, may be made within the scope of the appended claims without departing from the spirit of the invention.

I claim:

1. A well percussion tool that comprises a tubular housing including a high pressure chamber and a low pressure chamber, an opening into the high pressure chamber for the supply of high pressure fluid thereto, an opening from the low pressure chamber for the exhaust of fluid therefrom, and an axially directed opening between said chambers; two elements mounted for axial reciprocation within said housing, one of said elements having the form of a sleeve fitting slidably in the opening between the chambers, the other of said elements having the form of a piston fitting slidably in said sleeve, each of said elements having a working surface exposed to the high pressure chamber, separate elastic means for urging each of said elements toward the high pressure chamber, said elastic urging means causing said elements to engage to close the opening between the chambers so that a pressure differential may be established to force the elements in the other direction, a hammer attached to one of the elements and an anvil limiting the movement of said hammer and the element attached to it in a direction away from said high pressure chamber after said element having the hammer attached thereto has passed out of engagement with the other element thus releasing the pressure differential between the chambers and allowing the other element to move back toward said high pressure chamber, the elastic urging means for the element having the hammer attached thereto having less thrust per unit area of working surface of that element than the elastic means for the other element and the total inertia of the element having the hammer attached thereto being greater than that of the other element whereby a gradual increase in pressure in said high pressure chamber will cause said elements to become disengaged without reciprocation of one of the elements and whereby a rapid increase in said pressure will cause both elements to reciprocate.

2. A well percussion tool comprising a tubular housing, sliding sleeve and piston elements reciprocally mounted in said housing for movement in the same direction from an upper mutually telescoping position dividing the housing into a high pressure chamber and a low pressure chamber to a lower position in which the piston is withdrawn from the lower end of the sleeve, said housing having a drilling mud inlet to said high pressure chamber and a mud outlet from said low pressure chamber, a first spring biasing said piston toward said inlet, a second spring biasing said sleeve toward said inlet, said sleeve and piston each having a surface exposed to the pressure of the high pressure chamber, the thrust of said first spring per unit area of exposed surface of the piston being lower than the thrust of said second spring per unit area of exposed surface of said sleeve but the inertia of said piston being substantially in excess of the inertia of said sleeve so that in response to rapid pressurization of the high pressure chamber the sleeve moves more rapidly than the piston and so that in response to gradual pressurization of the high pressure chamber the piston moves to its lower position while the sleeve remains in its upper position, and impact receiving means in the path of reciprocation of the piston between the egress thereof from the lower end of the sleeve and the re-entry thereof into said sleeve to which the piston element imparts a blow.

3. A well percussion tool comprising a tubular housing, sliding sleeve and piston elements reciprocally mounted in said housing for individual movement in the same direction from an upper mutually telescoping position dividing the housing into a high pressure chamber and a low pressure chamber to a lower position in which the sleeve is withdrawn from around the lower end of the piston, said housing having a drilling mud inlet to said high pressure chamber and a mud outlet from said low pressure chamber, a first spring biasing said sleeve toward said inlet, a second spring biasing said piston toward said inlet, said sleeve and piston each having a surface exposed to the pressure of the high pressure chamber, a thrust of said first spring per unit area of exposed surface of the sleeve being lower than the thrust of said second spring per unit area of exposed surface of said piston but the inertia of said sleeve being substantially in excess of the inertia of said piston so that in response to rapid pressurization of the high pressure chamber the piston moves more rapidly than the sleeve and so that in response to gradual pressurization of the high pressure chamber the sleeve moves to its lower position while the piston remains in its upper position, and impact receiving means in the path of reciprocation of the sleeve element between the separation thereof from the lower end of the piston and the return thereof into piston-surrounding position to which the sleeve element imparts a blow.

4. The apparatus of claim 1 in combination with a rubberized coating formed on the innerface of one of said reciprocating elements to bear against the other reciprocating element to reduce the frictional wear of said elements.

ROSS BASSINGER.

References Cited in the file of this patent

UNITED STATES PATENTS

| Number | Name | Date |
|---|---|---|
| 1,861,042 | Zublin | May 31, 1932 |
| 1,892,517 | Pennington | Dec. 27, 1932 |
| 2,002,387 | Bannister | May 21, 1935 |
| 2,245,786 | Johnson | June 17, 1941 |
| 2,344,725 | Phipps | Mar. 21, 1944 |
| 2,507,585 | Bassinger | May 16, 1950 |